Dec. 6, 1949     D. V. STELLIN     2,490,718
INTERCHANGEABLE DRILL JIG BUSHING AND LINER THEREFOR
Filed Feb. 20, 1946
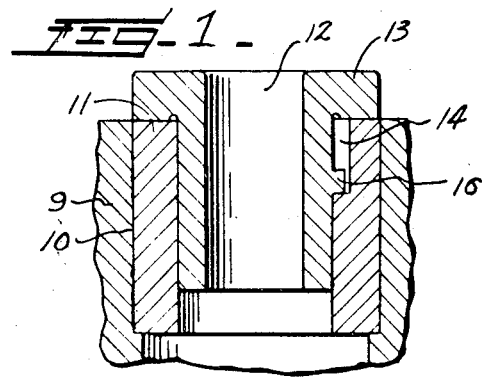
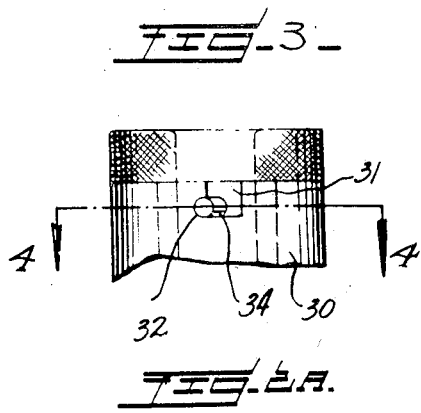
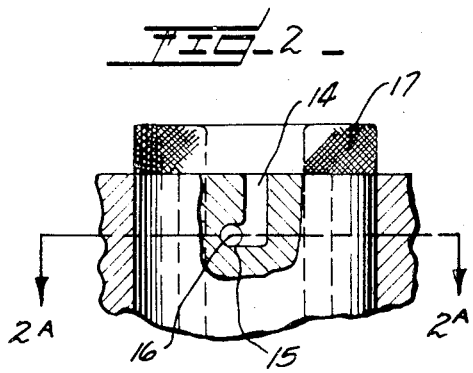
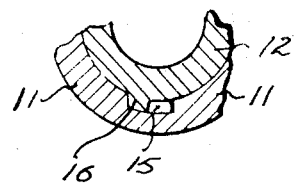
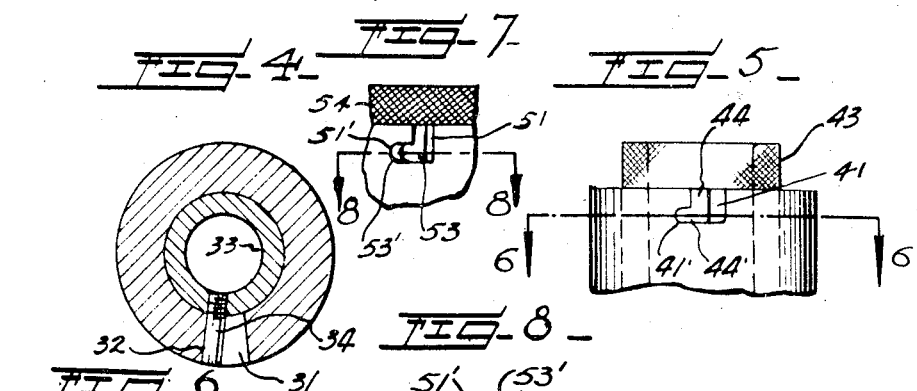
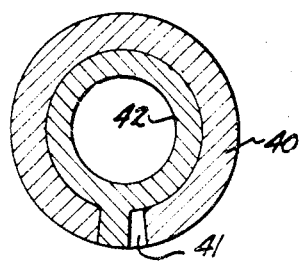
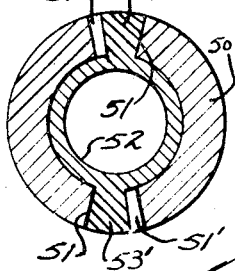
INVENTOR.
Domnic V. Stellin
BY
Samuel Wecgman
Attorney Patented Dec. 6, 1949

2,490,718

UNITED STATES PATENT OFFICE 2,490,718

INTERCHANGEABLE DRILL JIG BUSHING AND LINER THEREFOR

Domnic V. Stellin, Detroit, Mich.

Application February 20, 1946, Serial No. 648,894

5 Claims. (Cl. 77—62)

This application is a continuation-in-part of my copending application, Serial No. 527,994, filed March 24, 1944, now abandoned.

The present invention pertains to a novel liner and bushing to be used in drilling, reaming or guiding a drill or reamer.

Ordinarily the bushing is merely set in the liner. It has a sliding fit in order that it may easily be replaced. In the absence of an attaching means, however, the bushing is rotated by the tool passing therethrough, with the result that it wears loose in time and causes wobbling of the tool and inaccuracy in the operation. Also, the bushing frequently rides up on the tool spindle, and the operator is required to stop the machine to return the bushing to the liner. It is evident that both of these difficulties result in economic loss, such as waste of material and labor, damage to the bushings and liners, and loss of time through periodic idleness of equipment. In high production the accumulated losses are substantial.

The principal object of the invention is to provide a bushing that locks in its liner by a quick and simple movement. Thus, the bushings are quickly replaceable as in changing from a drill bushing to a ream bushing for the same job or in retooling for a different job. This object is accomplished essentially by the use of a quick-release coupling between the bushing and liner and consisting, for example, of a projection from one of the parts extending into an undercut notch or slot in the other part. Thus, the bushing is prevented from rotating and from lifting out of the liner. The absence of rotation eliminates heat of friction, wear and expansion of the parts, and eventual binding of the bushing or the tool spindle.

The simplest embodiment of the invention provides an L-shaped notch or groove in the liner receiving a locking key, such as a pin or an L-shaped lug, projecting from the bushing. The key is received in the toe of the L-shaped slot and is thus retained against both rotation and lifting out, until released manually by a turn opposite to the operating direction of rotation. The notch and pin are characterized by the fact that the pin enters the stem or axial portion of the notch by an axial sliding movement and then turns circumferentially into the toe portion of the notch. Both the notch and the pin are of simple formation and effectively perform their locking function without the need of eccentric or other complicated surfaces or shapes.

Where an L-shaped lug is employed as the projecting locking member its widest portion at the toe is receivable and slidable axially in the leg of the L-shaped notch. At the end of the inserting movement, a slight turn of one of the parts inserts the toe of the lug in the toe of the notch.

Another advantage resulting from the described construction is that the lock constitutes a support for the bushing in the liner. In other words, the bushing need not have the usual head or flange extending radially outward from its upper end. The external diameter of the bushing may be uniform throughout, thereby simplifying the manufacture of the bushing and reducing the cost thereof.

The invention is fully disclosed by way of example in the following description and in the accompanying drawings in which:

Figure 1 is an axial section of a liner and bushing assembly according to the invention;

Figure 2 is an elevation thereof, partly in section;

Figure 3 is an elevation of another form;

Figure 4 is a section on the line 4—4 of Figure 3;

Figure 5 is an elevation of another embodiment;

Figure 6 is a section on the line 6—6 of Figure 5;

Figure 7 is a detail elevation of still another embodiment; and

Figure 8 is a section on the line 8—8 of Figure 7.

Reference to these views will now be made by use of like characters which are employed to designate corresponding parts throughout.

In Figure 1 is shown a member 9 which may be a bushing plate or a part of a jig or fixture employed in a drilling or reaming operation and adapted to support a liner. It will be understood that such a member is the support for the various embodiments of the invention described herein. The plate 9 is formed with a hole 10 into which is press-fitted a hard steel liner 11 in the form of a cylinder.

The liner receives a bushing 12 also made of hard steel but not tightly fitted therein, in order to permit ready replacement, as well known in the art. The bushing has an upper flange 13 of the same outside diameter as the liner, to provide a uniform outer wall. The inner wall of the liner is formed with an L-shaped slot or notch having a relatively long vertical leg 14 and a shorter toe 15. The leg 14 extends axially of the liner, and the toe 15 extends circumferentially thereof. It will also be seen that the slot does not extend through to the outside diameter of the liner but terminates considerably short thereof in the radial direction, thus conserving the strength of the upper end of the liner.

The outer surface of the bushing carries a pin 16 of such size as to slide axially in the leg 14 and then pass into the toe 15 by a slight turn of the bushing. The seated position of the pin 16 in the toe 15 is shown in Figure 2, where the bushing is locked against rotation. The outer end of the pin is out of contact with any wall of the slot, as shown in Figure 1, so that a chip of metal will not bind between this end and a slot wall. The exposed upper end of the bushing is preferably knurled at 17 for easy manipulation.

Figures 3 and 4 show a construction generally similar to that of Figures 1 and 2. The liner 30 has an axial slot cut therethrough and consisting of a vertical leg 31 with a short rounded lateral toe 32 at its lower end. The bushing 33 has a pin 34 screwed into its wall and of such diameter as to slide axially in the leg 31 and to pass readily into the toe 32 by a slight turn of the bushing, as already set forth.

In the embodiment shown in Figures 5 and 6, the liner 40 also has an L-shaped slot extending entirely through its wall. The slot consists of an axial leg portion 41 and a laterally or circumferentially extending toe 41'. The bushing 42 has a knurled upper exposed end 43, but it will be noted that this end is of no larger outside diameter than the body of the bushing. The usual head at the upper end of the bushing for support for suspension, as in Figures 1 and 3, is not necessary, for a reason that will presently be set forth. Beneath the end 43 the bushing is formed with an L-shaped lug or key 44 having a toe 44'.

The leg 41 of the slot is of such width as to receive the wider portion of the lug, namely its toe 44'. The bearing of the toe 44' on the bottom of the slot 41, 41' constitutes sufficient support for the bushing in the liner, so that an extended head on the bushing is not necessary.

The embodiments heretofore described show the liner and bushing equipped with only one locking means. Figures 7 and 8 show two locking units on one assembly. In Figure 8 is shown a liner 50 having opposed L-shaped slots 51 extending therethrough and diametrically opposite one another. The toes 51' of the slots extend in the same circumferential direction. The bushing 52 carries opposed L-shaped keys or lugs at diametrically opposite points on its outer wall, each key or lug comprising a shank 53 and a toe 53'. The toes 53' of the keys are adapted to slide vertically or axially in the legs 51 of the slots, and then enter the toes 51' of the slots by a slight turn of the bushing. The toes 53' do not extend fully into the slot toes 51', leaving spaces to accommodate metal chips and thus prevent them from binding. The end 54 of the bushing is above the keys 53, 53' and preferably has the same outside diameter as the liner, as described in connection with Figure 3. In the provision of opposed locking keys on the bushing, still more support for the latter is provided in the absence of an extended head.

The L-shaped slot in each of the described constructions is characterized by the short angular or circumferential extent of both the leg and toe of the slot, each being only a few degrees or a small fraction of the entire circumference. This construction is to be distinguished from prior devices which lock by a rotative movement of the bushing in cut-away portions of the liner extending throughout the entire circumference or 360°.

Figure 2A illustrates the short angular extent of the toe 15 and the concentric lateral wall of this portion of the slot. The labor in manufacturing saved by dispensing with eccentric surfaces is readily apparent.

Although specific embodiments of the invention have been illustrated and described, it will be understood that various alterations in the details of construction may be made without departing from the scope of the invention as indicated by the appended claims.

What I claim is:

1. A bushing assembly for a rotating tool, comprising a liner, a bushing slidably mounted therein, said liner having an L-shaped slot with a vertical leg extending axially from the upper end of the liner and a toe extending circumferentially from the lower end of said leg, said toe being closed at the end remote from said vertical leg and a radially outwardly extending projection having its inner end secured to said bushing and adapted to move axially in said leg and circumferentially in said toe, the outer extremity of said projection being out of contact with the walls of said slot, said bushing being of equal outside circumference immediately adjacent to both sides of said projection in the axial direction.

2. A bushing assembly for a rotating tool, comprising a liner, a bushing slidably mounted therein, said liner having an L-shaped slot with a vertical leg extending axially from the upper end of the liner and a toe extending circumferentially from the lower end of said leg, said toe being closed at the end remote from said vertical leg, said slot being cut in the inner wall of said liner and having a lateral wall disposed between said inner wall and the outer wall of said liner, said lateral wall being concentric with said inner wall, and a radially outwardly extending projection having its inner end secured to said bushing and adapted to move axially in said leg and circumferentially in said toe, the outer extremity of said projection being out of contact with the walls of said slot.

3. A bushing assembly for a rotating tool, comprising a liner, a bushing of uniform outside diameter slidably mounted therein, said liner having an L-shaped slot with a vertical leg extending axially from the upper end of the liner and a toe extending circumferentially from the lower end of said leg, said toe being closed at the end remote from said vertical leg and a radially outwardly extending projection having its inner end secured to said bushing and adapted to move axially in said leg and circumferentially in said toe, the outer extremity of said projection being out of contact with the walls of said slot, said bushing being of equal outside circumference immediately adjacent to both sides of said projection in the axial direction.

4. A bushing assembly for a rotating tool, comprising a liner, a bushing slidably mounted therein, one of said parts having a substantially right angular slot including an axial leg open at one end and a toe portion extending circumferentially from the other end of said leg, said toe portion being closed at the end remote from said vertical leg and a radially outwardly extending projection having one end secured to the other part, said projection being adapted to move in and along said leg and toe portion, said other part being of equal outside circumference immediately adjacent to both sides of said projection in the axial direction.

5. A bushing assembly for a rotating tool, comprising a liner of uniform outside diameter, a bushing slidably mounted therein, one of said parts having a substantially right angular slot including an axial leg open at one end and a toe portion extending circumferentially from the other end of said leg, said toe portion being closed at the end remote from said vertical leg, and a radially outwardly extending projection having one end secured to the other part, said projection being adapted to move in and along said leg and toe portion, said other part being of equal outside circumference immediately adjacent to both sides of said projection in the axial direction.

DOMNIC V. STELLIN.

REFERENCES CITED

The following references are of record in the file of this patent:

UNITED STATES PATENTS

| Number | Name | Date |
| --- | --- | --- |
| 535,278 | Downing | Mar. 5, 1895 |
| 1,024,285 | Sanphy | Apr. 23, 1912 |
| 1,282,681 | Faribault | Oct. 22, 1918 |
| 1,465,236 | Briney | Aug. 14, 1923 |
| 1,479,583 | Carey | Jan. 1, 1924 |
| 1,587,504 | Briney | June 8, 1926 |
| 1,602,367 | Muth | Oct. 5, 1926 |
| 1,603,022 | Briney | Oct. 12, 1926 |
| 1,706,847 | Fisher | Mar. 26, 1929 |
| 1,748,006 | Wohlart | Feb. 18, 1930 |

FOREIGN PATENTS

| Number | Country | Date |
| --- | --- | --- |
| 139,666 | Great Britain | 1920 |